(74.)
A. KETCHUM.
Improvement in Pitman Connections.
No. 121,789.        Patented Dec. 12, 1871.
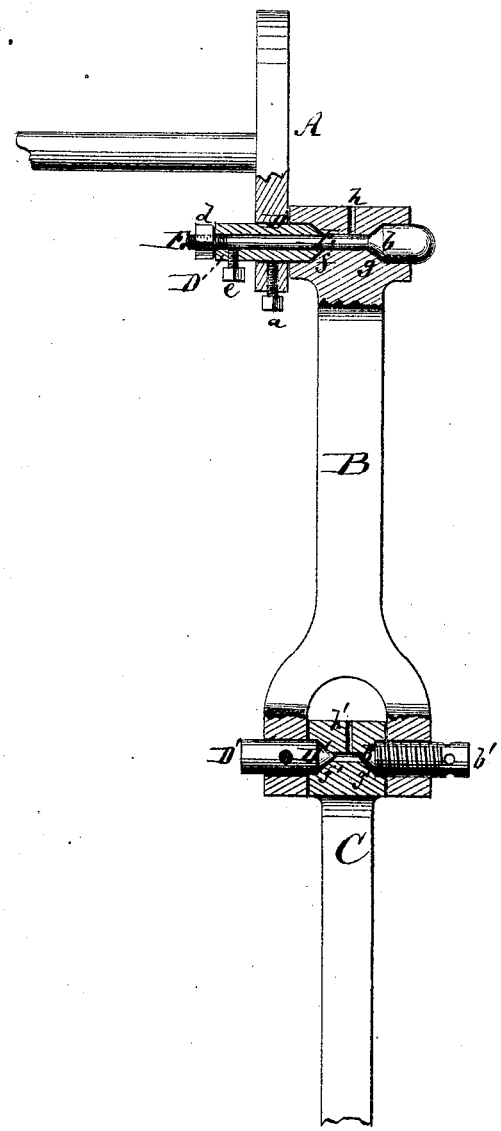
Witnesses:
Francis McArdle.
George W. Mabee
Inventor:
A. Ketchum.
Per
Attorneys.

121,789

UNITED STATES PATENT OFFICE.

AMOS KETCHUM, OF ESTHERVILLE, IOWA.

IMPROVEMENT IN PITMAN-CONNECTIONS.

Specification forming part of Letters Patent No. 121,789, dated December 12, 1871.

*To all whom it may concern:*

Be it known that I, AMOS KETCHUM, of Estherville, in the county of Emmett and State of Iowa, have invented a new and useful Improvement in Pitman-Connections for Harvesters and other Machinery; and I do hereby declare that the following is a full, clear, and exact description thereof, which will enable others skilled in the art to make and use the same, reference being had to the accompanying drawing forming part of this specification.

The drawing represents a top view, partly in section, of my improved pitman-connection.

The object of this invention is to provide a pitman-connection for harvesters and other machinery which will be positive in its action and cannot work loose. The invention will be first fully described and then clearly pointed out in the claim.

A, in the drawing, represents the carrier or crank-wheel. B is the pitman, and C the sickle-bar. Through the wheel A is fitted a tubular crank, D, which is held in place by means of a set-screw, $a$, or by a key, or which may be screwed into the wheel. The outer end of this tube is pointed and enters a pointed socket or recess, $f$, provided for its reception in the upper end of the pitman. E is a bolt fitted through the pitman and tube D. Its head $b$, which is conical at the inner end, enters a corresponding recess, $g$, in the pitman. A nut, $d$, is fitted upon the inner end of the bolt against the inner face of the wheel A. A set-screw, $e$, may, if desired, be fitted through the tube D against the bolt, as shown. The two conical recesses $f$ and $g$ in the pitman are connected with each other by a cylindrical aperture, through which the bolt F passes, and to which lubricating material can be conveyed from a hole, $h$, in the side. The pitman is thus suspended from the outer end of the tube D and from the head of the bolt E, whose cylindrical bodies enter the recesses $f$ $g$ sufficiently far to constitute reliable supports for the pitman, while their conical ends serve to center it. When any of the surfaces are worn they are quickly righted by drawing the nut $d$, which brings the points together, and thus serves to produce a positive bearing. The connection with the sickle-bar is on substantially the same principle. There are two recesses, $f'$ $g'$, having conical ends, in the sickle-bar, while the forked end of the pitman contains two pointed screws, D' and $b'$, entering these sockets, respectively, the latter being connected for lubricating purposes, as shown. This mechanism may be applied to other machinery besides harvesters.

Having thus described my invention, I claim as new and desire to secure by Letters Patent—

A crank-pitman, provided with prongs and pointed screws D' B' at one end, and bolt E $b$ and tube D at the other, combined, as described, with sickle-bar C and crank-wheel A, all being constructed and arranged so as to operate in the manner set forth.

AMOS KETCHUM.

Witnesses:
   EZRA H. BALLARD,
   ALEXANDER MCKAY. (74)